United States Patent
Lee et al.

(10) Patent No.: US 7,814,237 B2
(45) Date of Patent: Oct. 12, 2010

(54) DUAL MODE MOBILE COMMUNICATION TERMINAL AND METHOD FOR AUTOMATICALLY RECOGNIZING CARD INFORMATION AND SELECTING A DRIVE MODE

(75) Inventors: Sang-Ho Lee, Suwon-si (KR); Jae-Min Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 351 days.

(21) Appl. No.: 11/253,328

(22) Filed: Oct. 19, 2005

(65) Prior Publication Data

US 2006/0095600 A1    May 4, 2006

(30) Foreign Application Priority Data

Oct. 30, 2004    (KR)    ...... 10-2004-0087667

(51) Int. Cl.
  *G06F 7/00*    (2006.01)
  *G06F 3/00*    (2006.01)
(52) U.S. Cl. .................. 710/14; 710/8; 710/15
(58) Field of Classification Search ......... 455/553.1, 455/411, 425, 558, 404, 432, 435, 445, 466, 455/552; 710/14, 8, 74; 370/335, 338, 401, 370/464, 465; 709/200, 227, 230
See application file for complete search history.

(56) References Cited

U.S. PATENT DOCUMENTS

| 5,884,168 | A  | * | 3/1999  | Kolev et al. ............ 455/432.1 |
| 6,137,802 | A  | * | 10/2000 | Jones et al. ............... 370/401 |
| 6,138,010 | A  | * | 10/2000 | Rabe et al. .............. 455/426.1 |
| 6,415,159 | B1 | * | 7/2002  | Miyashita ................. 455/558 |
| 6,439,464 | B1 | * | 8/2002  | Fruhauf et al. ............. 235/492 |
| 6,606,491 | B1 | * | 8/2003  | Peck ....................... 455/411 |
| 6,913,196 | B2 | * | 7/2005  | Morrow et al. ............. 235/451 |
| 7,103,432 | B2 | * | 9/2006  | Drader et al. ............... 700/95 |
| 7,181,237 | B2 | * | 2/2007  | Stockhusen ............. 455/552.1 |
| 7,187,923 | B2 | * | 3/2007  | Mousseau et al. .......... 455/416 |
| 7,277,705 | B2 | * | 10/2007 | Casaccia et al. ......... 455/435.1 |
| 7,328,016 | B2 | * | 2/2008  | Buckley .................. 455/435.2 |
| 7,346,368 | B2 | * | 3/2008  | Llanos et al. ........... 455/550.1 |
| 7,349,695 | B2 | * | 3/2008  | Oommen et al. ......... 455/432.1 |
| 7,377,442 | B2 | * | 5/2008  | Kim et al. ................. 235/486 |
| 7,403,517 | B2 | * | 7/2008  | Westman .................. 370/352 |
| 7,430,602 | B2 | * | 9/2008  | Babbar et al. ............. 709/227 |
| 2004/0022216 | A1 | * | 2/2004 | Shi ........................ 370/335 |

(Continued)

FOREIGN PATENT DOCUMENTS

CN    1243403    2/2000

(Continued)

*Primary Examiner*—Henry W Tsai
*Assistant Examiner*—Cheng-Yuan Tseng
(74) *Attorney, Agent, or Firm*—The Farrell Law Firm, LLP

(57) ABSTRACT

A dual-mode mobile communication terminal and a method, which automatically recognize a card and select a drive mode. The dual-mode mobile communication terminal includes a first slot and a second slot into which a first card or a second card having subscriber information for a first communication or a second communication are inserted, and a control unit for automatically selecting a drive mode according to a type of a card inserted into the first slot or the second slot.

10 Claims, 7 Drawing Sheets

```
SLOT #1: UIM CARD
PIN CODE: ********

SLOT #2: SIM CARD
PIN CODE: _____
```

U.S. PATENT DOCUMENTS

| | | | |
|---|---|---|---|
| 2004/0209651 A1* | 10/2004 | Tsukamoto | 455/558 |
| 2004/0233930 A1* | 11/2004 | Colby, Jr. | 370/464 |
| 2004/0260750 A1* | 12/2004 | Ruutu et al. | 709/200 |
| 2004/0266480 A1* | 12/2004 | Hjelt et al. | 455/558 |
| 2005/0238046 A1* | 10/2005 | Hassan et al. | 370/465 |
| 2005/0282583 A1* | 12/2005 | Kawai et al. | 455/558 |
| 2006/0142052 A1* | 6/2006 | Lai et al. | 455/552.1 |
| 2007/0189241 A1* | 8/2007 | Zhang | 370/338 |

FOREIGN PATENT DOCUMENTS

| | | |
|---|---|---|
| CN | 2601491 | 1/2004 |
| KR | 2002-88471 | 11/2002 |
| KR | 2004-3222 | 1/2004 |

* cited by examiner

DUAL MODE MOBILE COMMUNICATION TERMINAL AND METHOD FOR AUTOMATICALLY RECOGNIZING CARD INFORMATION AND SELECTING A DRIVE MODE

PRIORITY

This application claims priority to an application entitled "Dual Mode Mobile Communication Terminal and Method for Automatically Recognizing Card Information and Selecting Drive Mode" filed in the Korean Intellectual Property Office on Oct. 30, 2004 and assigned Serial No. 2004-87667, the contents of which are incorporated herein by reference.

BACKGROUND OF THE INVENTION

1. Field of the Invention

The present invention relates generally to a dual-mode support mobile communication terminal and a method for selecting a drive (communication) mode thereof, and more particularly to a dual-mode support mobile communication terminal and a method using the same, the method automatically recognizing a card inserted into a slot and selecting a drive mode.

2. Description of the Related Art

Information relating to a user may be stored separately from a mobile communication terminal, and a separate storage used in this case is called a user identity module (UIM). The UIM is realized as a smart card due to a necessity for security of user information. In a mobile communication system employing a GSM (Global System for Mobile Communications) scheme, user identity modules called a subscriber identity module (SIM) are already widely used for commercial business.

Information stored in the UIM includes a subscriber's phone number, a phone book, transmission/reception message, a password, a key value for authentication of a subscriber (i.e., for a procedure for judging whether or not a user is a regular subscriber), an encryption module, network information, roaming information, etc.

According to the prior art, GSM terminals can be used only in a GSM network and CDMA (Code Division Multiple Access) terminals can be used only in a CDMA network. Therefore, in order to use a terminal, a user must purchase a card corresponding to the terminal, that is, a SIM card for the GSM scheme and a UIM card for the CDMA scheme.

A world phone supports both of the GSM scheme and the CDMA scheme. Accordingly, the world phone either has two slots (into which two types of cards can be inserted) or has one slot (into which an integrated card can be inserted). Typically, CDMA providers did not permit the use of the UIM card. Recently, however, CDMA providers, such as China Unicom and Thailand Hutchison, are permitting the use of the UIM card.

In addition, it is expected that the use of prepaid cards will increase more and more. Therefore, terminals (such as a world phone) capable of supporting both of the GSM scheme and the CDMA scheme may greatly increase and may be widely popularized.

When using a terminal supporting the two schemes, a user must know the types of cards (i.e., each card for which one of the two schemes) to be inserted into the terminal by the user, the type of scheme employed in the main system of a provider from which the user is provided with services in a user's current location, etc. When the user inserts a card into the terminal without knowing such matters relating to the card, the terminal may malfunction or an error may occur. In this case, there is an inconvenience in that the user must separate its battery, separate the card from a relevant slot, and check the kind of the slot. Additionally, the user must ask a service center about the type of scheme employed in the main system. Further, when two cards are inserted into both slots, it is more difficult to distinguish that which card is inserted into any one of the slots. In addition, because the two types of cards have a similar shape, it is not easy to distinguish the types of cards with the naked eye.

SUMMARY OF THE INVENTION

Accordingly, the present invention has been designed to solve the above and other problems occurring in the prior art.

An object of the present invention is to provide a dual-mode mobile communication terminal and a method using the same, which automatically recognize an inserted card and select a drive mode according to the inserted card, such that a user need not know information about each card to be inserted.

To accomplish this object, in accordance with one aspect of the present invention, there is provided a dual-mode mobile communication terminal operating in a first communication mode and a second communication mode. The dual-mode mobile communication terminal includes: a first slot into which a first card or a second card having subscriber information for a first communication or a second communication is inserted; a second slot into which a first card or a second card having subscriber information for a first communication or a second communication is inserted; and a control unit for automatically selecting a drive mode according to a type of a card inserted into the first slot or the second slot and determining if the drive mode accords with a communication mode of a current system.

In accordance with another aspect of the present invention, there is provided a method for automatically recognizing a card and selecting a drive mode in a dual-mode mobile communication terminal, which has a first slot and a second slot. The method includes the steps of: determining if a card exists by searching the first slot and second slot; reading cards when the cards exist in both the first and second slots, notifying a user of relevant modes of the read cards, driving in an initial mode, and entering another mode when a signal of the initial mode is not received until a predetermined period of time elapses; reading a card existing in the first slot when the card exists only in the first slot, notifying a user of a relevant mode of the read card, and driving in the relevant mode; and reading a card existing in the second slot when the card exists only in the second slot, notifying a user of a relevant mode of the read card, and driving in the relevant mode.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
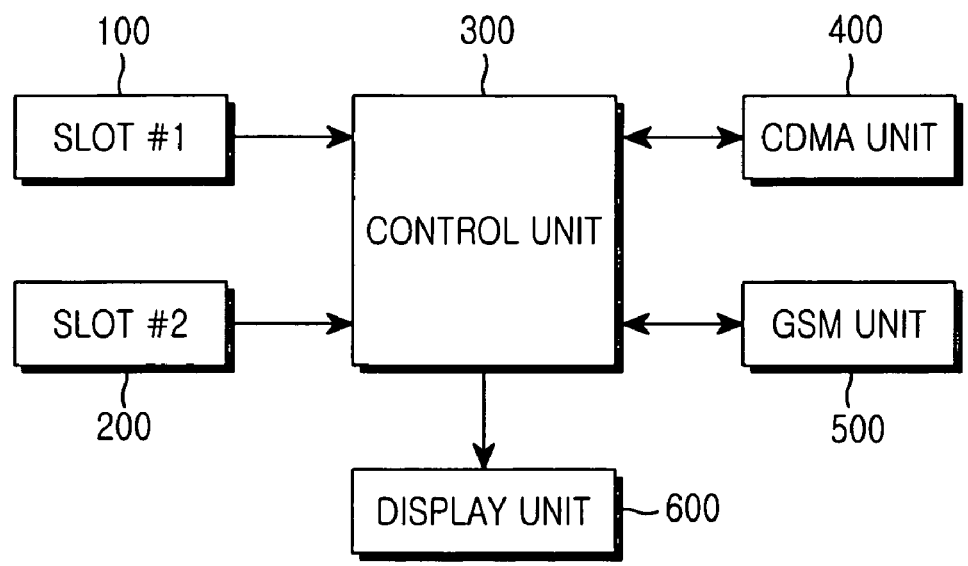
FIG. 1 is a block diagram illustrating a dual-mode mobile communication terminal according to an embodiment of the present invention.

Hereinafter, preferred embodiments of a dual-mode support mobile communication terminal and a method for automatically recognizing a card inserted into a slot and selecting a drive mode according to the present invention will be described with reference to the accompanying drawings. It is to be noted that the same elements are indicated with the same reference numerals throughout the drawings. Although a number of specific features, such as specific components of a circuitry, are given below, they are presented for a better understanding of the present invention only.

Also, it will be clear to those skilled in the art that the present invention can be practiced without such specific features. Accordingly, in the following description of the present invention, a detailed description of known functions and configurations incorporated herein will be omitted when it may obscure the subject matter of the present invention.

FIG. 1 is a block diagram illustrating a dual-mode mobile communication terminal according to an embodiment of the present invention. Referring to FIG. 1, slots #1 and #2 100 and 200 receive a subscriber identity module ('SIM') card or a user identity module ('UIM') card, which stores user information such as a phone number, an individual password, etc. A CDMA (Code Division Multiple Access) unit 400 and a GSM (Global System for Mobile Communications) unit 500 enables the mobile communication terminal to communicate with a CDMA network and a GSM network, respectively.

A display unit 600 displays various states according to the operation of the mobile communication terminal. That is, the display unit 600 displays various display screens such as the type of inserted card, request for input of a personal identification number (PIN), selected drive mode, etc., as will be described herein below with reference to FIGS. 2 to 8.

A control unit 300 determines if a card is inserted into the slots #1 and #2 100 and 200, determines what type of card is inserted, and then selects a drive mode.

FIGS. 2 to 8 are views for representing screen states resulting from the recognition of cards in the dual-mode mobile communication terminal according to embodiments of the present invention.

The mobile communication terminal according to the present invention automatically recognizes information of a card inserted into at least one slot and is driven in a mode corresponding to the recognized information, thereby improving user convenience. A user may insert cards into the slots in the following methods:

a. A UIM card and an SIM card are inserted into slots #1 and #2, respectively, without any order.
b. A card supporting both of the UIM and the SIM is inserted into one of slots #1 and #2.
c. Either the UIM card or the SIM card is inserted into one of slots #1 and #2.

Figure 2:
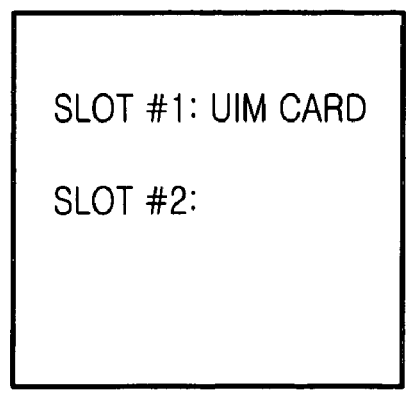
FIGS. 2 to 8 are views of screen states resulting from the recognition of cards in the dual-mode mobile communication terminal according to embodiments of the present invention.

FIG. 2 illustrates a screen state when it is determined that a card is inserted into only slot #1, the type of the inserted card corresponds to the UIM and a PIN code is not registered, as a result of searching the two slots, in the dual-mode mobile communication terminal having the two slots. Because a PIN code is not registered a user does not have to input a password before the UIM card is read.

Figure 3:
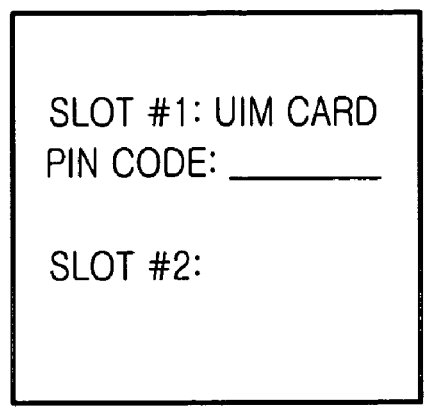

A screen state shown in FIG. 3 differs from that shown in FIG. 2 in that an input part for a user password is displayed because a PIN code is registered.

Figure 4:
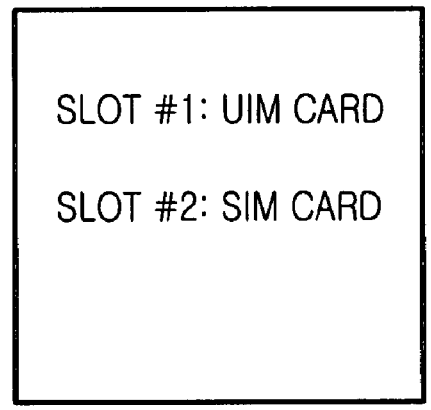

FIG. 4 illustrates a screen state in which two cards are inserted into both slots #1 and #2, the types of the inserted cards correspond to the UIM and SIM, respectively, and PIN codes are not registered.

Figure 5:
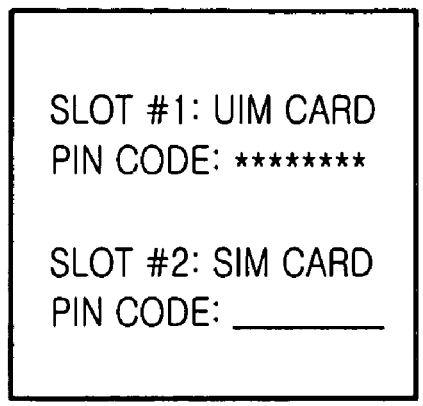

A screen state shown in FIG. 5 differs from that shown in FIG. 4 in that input parts for user passwords are displayed because PIN codes for the UIM and SIM are registered.

Figure 6:
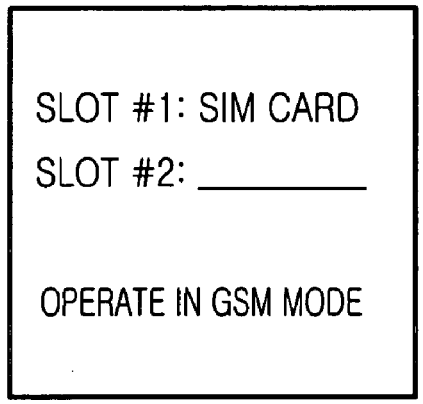

FIG. 6 represents that a card is inserted into only slot #1, the type of the inserted card corresponds to the SIM and a PIN code is not registered, so that the mobile communication terminal drives in a GSM mode.

Figure 7:
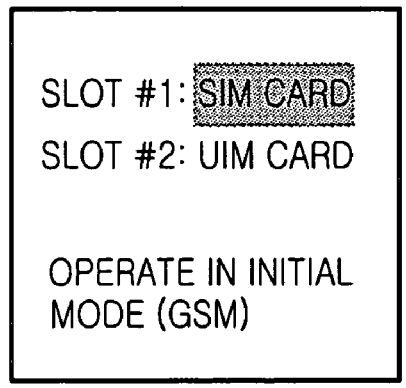

FIG. 7 represents that two cards are inserted into both of the slots, the types of the inserted cards correspond to the UIM and SIM, respectively and PIN codes are not registered, thereby causing the mobile communication terminal to drive in a predetermined initial mode. In FIG. 7, a GSM mode is represented as the initial mode because it is assumed that the main system of a relevant provider employs the GSM scheme. It is possible that a user selects and set an initial mode according to user preference. Further, the initial mode may be set as the same mode as that of the main system of a provider that provides the mobile communication terminal, when the provider requests a manufacturer to set the initial mode of the relevant terminal as a mode of the main system.

Figure 8:
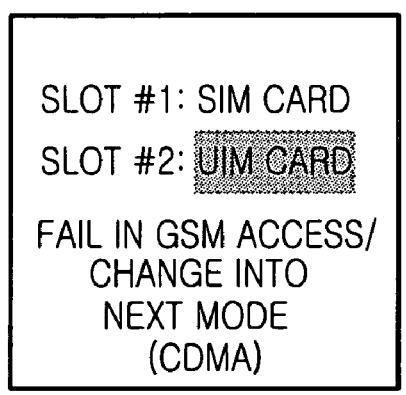

FIG. 8 illustrates a screen state indicating a failure of signal reception in the initial mode as illustrated in FIG. 7 and conversion into the next mode. Herein, the next mode represents a mode other than the GSM mode, such that indicates a CDMA mode because it is assumed that the UIM card is inserted in this embodiment.

Figure 9A:
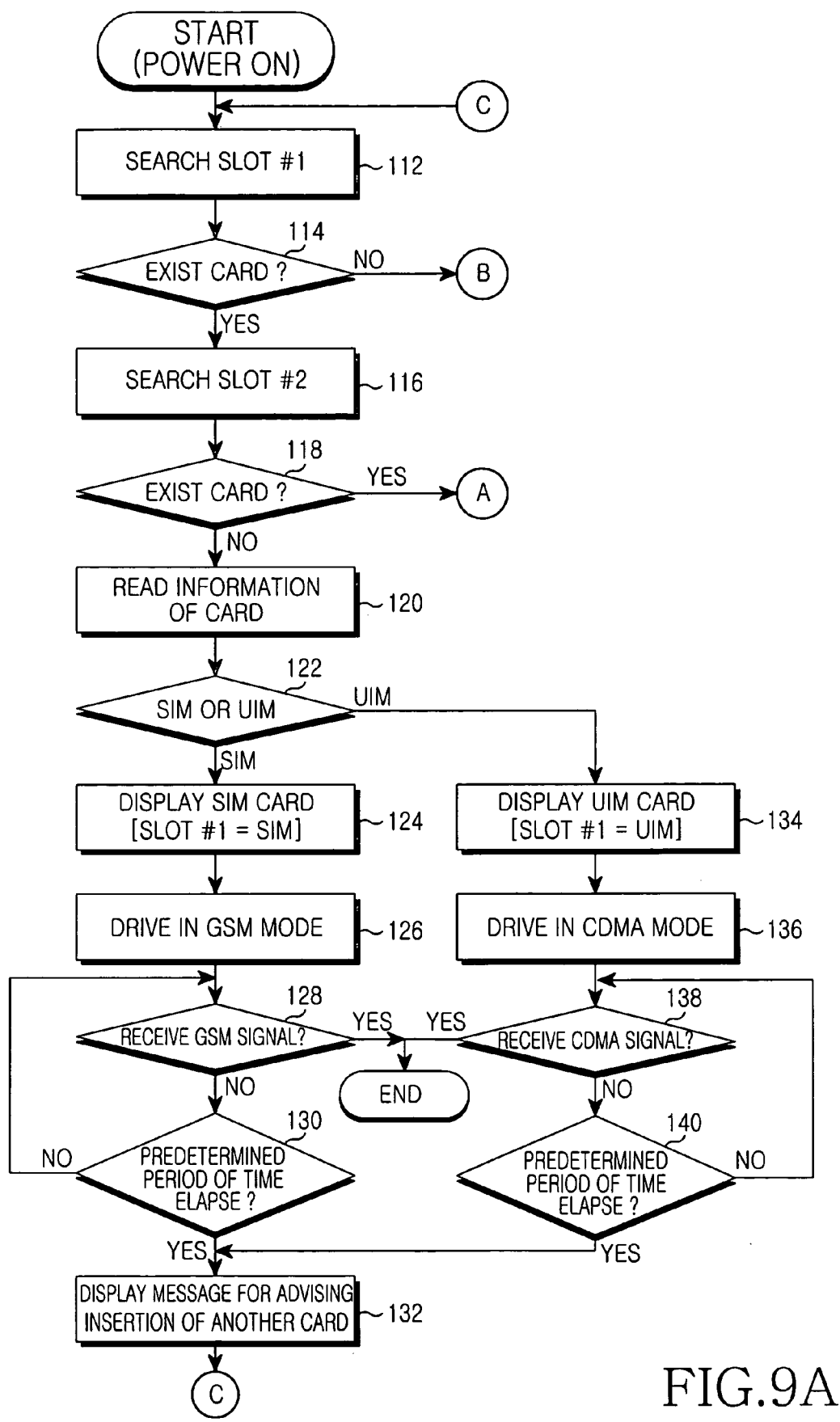
FIGS. 9A to 9C are flowcharts illustrating a method of automatically recognizing a card and selecting a drive mode in the dual-mode mobile communication terminal according to embodiments of the present invention.
Figure 9B:
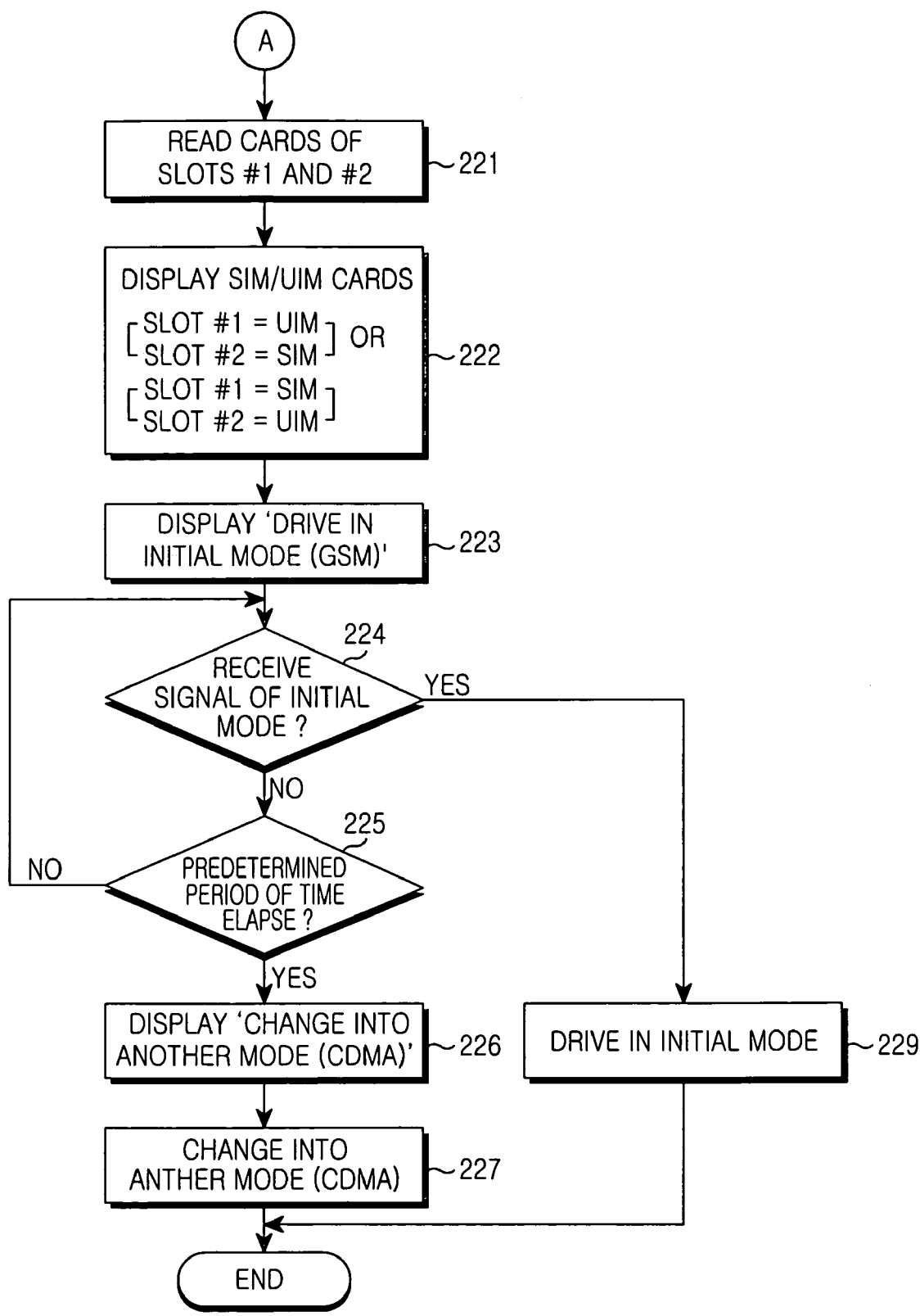
Figure 9C:
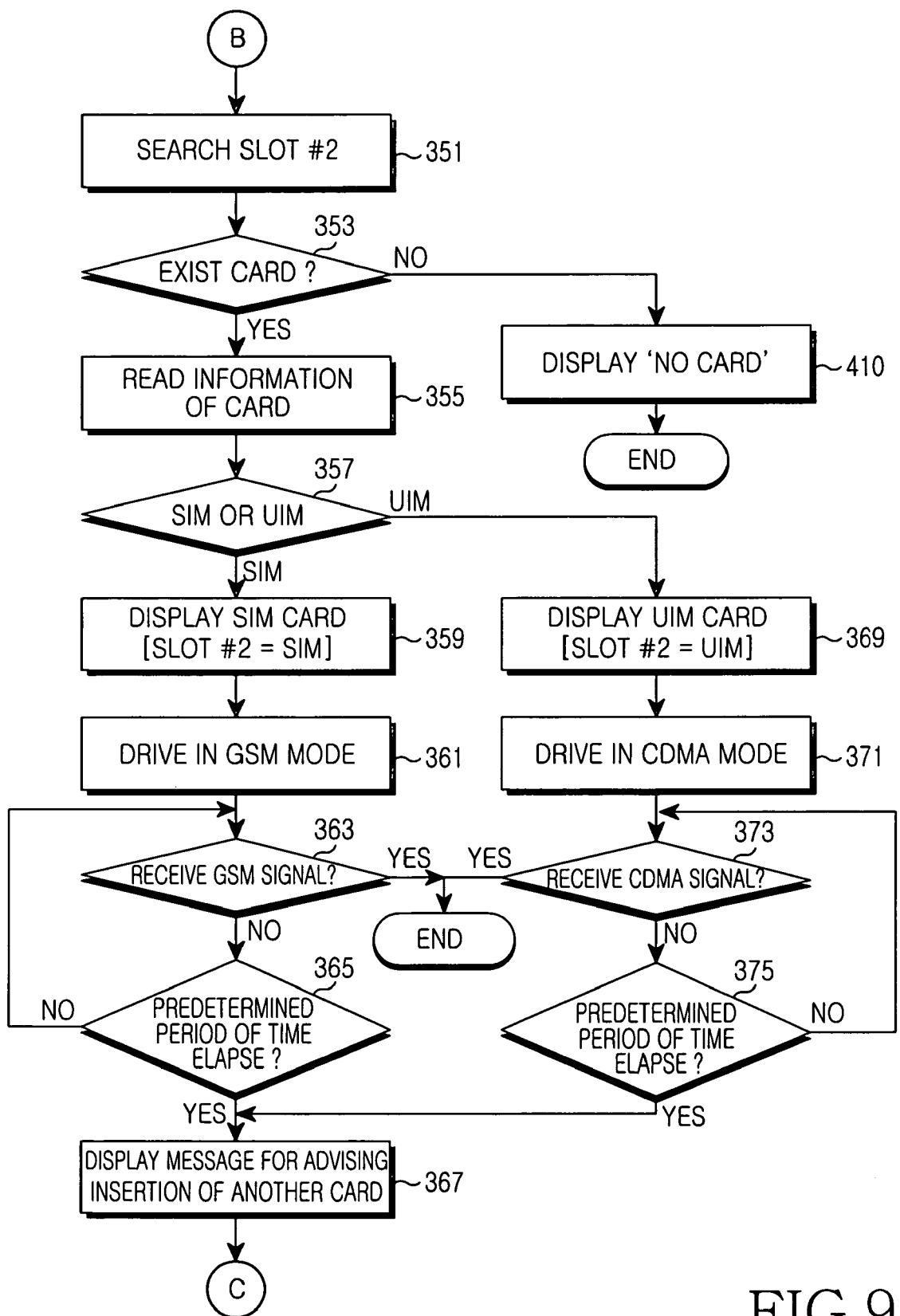

FIGS. 9A to 9C are flowcharts illustrating a method of automatically recognizing an inserted card and selecting a drive mode in the dual-mode mobile communication terminal according to embodiments of the present invention. Referring to FIG. 9A, when the dual-mode mobile communication terminal is powered on, the control unit 300 searches slot #1 in step 112 and then determines if a card exists in (i.e., is inserted into) slot #1 in step 114. When a card exists in the slot #1, the control unit 300 searches slot #2 in step 116 and determines if a card exists in slot #2 in step 118. When a card does not exist in slot #2 but a card exists in only slot #1, the control unit 300 reads information of the card existing in the slot #1 in step 120 and identifies the type of the card in step 122.

When the type of the card corresponds to the SIM, the control unit 300 displays a message for informing that an SIM card is inserted into slot #1 on the display unit 600 in step 124 and drives in a GSM mode in step 126.

In step 128, the control unit 300 determines if a GSM signal is received. When a GSM signal is not received, the control unit 300 determines if a predetermined period of time (e.g., 30 seconds) elapses in step 130. The control unit 300 returns to step 128 when the predetermined period of time does not elapse, but proceeds step 132 when the predetermined period of time elapses. In step 132, the control unit 300 displays a message (e.g., "Area for CDMA service, Please insert another card."), advising a user to insert another card (e.g., UIM card) on the display unit 600, and then returns to step 112.

Although not shown, the control unit 300 may automatically change its mode into another mode (e.g., CDMA mode), determines if a signal is successfully received in the changed mode, and then outputs a message for advising a user to insert a card corresponding to the changed mode. Also, the control unit 300 first outputs a message for advising a user to insert another card and the performs a mode change. When the control unit 300 fails to receive each relevant signal in both modes, the CDMA unit 400 displays a message for notifying the user that the mobile communication terminal is located out of communication range.

As a result in step 122, when the type of the card corresponds to the UIM, the control unit 300 displays a message for informing that a UIM card is inserted into slot #1 on the display unit 600 in step 134 and drives in a CDMA mode in step 136. In step 138, the control unit 300 determines if a CDMA signal is received. When a CDMA signal is not received, the control unit 300 determines if a predetermined period of time elapses in step 140. The control unit 300 returns to step 138 when the predetermined period of time does not elapse, but proceeds step 132 when the predetermined period of time elapses.

In step 132, the control unit 300 displays a message (e.g., "Area for GSM service, Please insert another card."), advising a user to insert another card (e.g., SIM card) on the display unit 600, and then returns to step 112.

Referring to FIG. 9B, the control unit 300 reads information of cards inserted into slots #1 and #2 in step 221. Step 221 is when cards are inserted into both slots #1 and #2, respectively. In step 222, the control unit 300 displays whether each read card is an SIM card or a UIM card on the display unit 600. That is, the CDMA unit 400 displays that a UIM card is inserted into slot #1 and an SIM card is inserted into slot #2 or that an SIM card is inserted into slot #1 and a UIM card is inserted into slot #2.

In step 223, the control unit 300 displays that the mobile communication terminal drives in an initial mode. The initial mode is selected by the main system of a provider. It should be noted that a GSM mode is represented as an initial mode because it is assumed that the main system of the provider employs a GSM scheme in the embodiment of the present invention.

In step 224, the control unit 300 determines if a signal of the initial mode (a GSM signal on the above-mentioned assumption) is received. When a signal of the initial mode is not received, the control unit 300 determines if a predetermined period of time (e.g., 30 seconds) elapses in step 225. As a result, the control unit 300 returns to step 224 when the predetermined period of time does not elapse, but proceeds to step 226 when the predetermined period of time elapses.

In step 226, the control unit 300 displays a message for informing that the control unit 300 changes its mode into another mode (e.g., CDMA mode) on the display unit 600, and then proceeds to step 227 to change into another mode.

When the control unit 300 receives a signal of the initial mode in step 224 before the predetermined period of time does not elapse, the control unit 300 drives the mobile communication terminal in the initial mode in step 229.

Referring to FIG. 9C, in step 351, the control unit 300 searches slot #2 to determine if a card exists in slot #2. Step 351 is performed when a card is not inserted into slot #1.

When it is determined that a card exists in only slot #2 in step 353, the control unit 300 reads information of the card in step 355. In step 357, the control unit 300 identifies the type of the card.

As a result, when the card is a SIM card, the control unit 300 displays that the SIM card is inserted into slot #2 on the display unit 600 in step 359 and then drives in a GSM mode in step 361.

In step 363, the control unit 300 determines if a GSM signal is received. As a result, when a GSM signal is not received, the control unit 300 determines if a predetermined period of time (e.g., 30 seconds) elapses in step 365. As a result in step 365, when the predetermined period of time does not elapse, the control unit 300 returns to step 363.

However, when the predetermined period of time elapses, the control unit 300 proceeds to step 367. In step 367, the control unit 300 displays a message (e.g., "Area for CDMA service, Please insert another card."), advising a user to insert another card (e.g., a UIM card) on the display unit 600, and then returns to step 112.

As a result in step 357, when it is determined that the card is a UIM card, the control unit 300 displays a message indicating that a UIM card is inserted into slot #2 on the display unit 600 in step 369 and drives in a CDMA mode in step 371. In step 373, the control unit 300 determines if a CDMA signal is received.

When a CDMA signal is not received, the control unit 300 determines if a predetermined period of time elapses in step 375. The control unit 300 returns to step 373 when the predetermined period of time does not elapse, but proceeds step 367 when the predetermined period of time elapses.

In step 367, the control unit 300 displays a message (e.g., "Area for GSM service, Please insert another card."), advising a user to insert another card (e.g., SIM card) on the display unit 600, and then returns to step 112.

In step 353, if it is determined that a card does not exist even in slot #2, the control unit 300 proceeds to step 410 of displaying 'No Card'.

Hereinafter, the following description will be given of a method of selecting a mode (hereinafter, referred to as 'initial mode' in order to be distinguished from two other drive modes) for driving the terminal after step 222 as illustrated in FIG. 9B is performed.

An initial mode may be selected in consideration of both of the types of cards inserted into slots #1 and #2 and the scheme employed in the main system of a provider from which a user is provided with a service in a current location. More specifically, when both of the SIM and UIM cards are inserted into slots #1 and #2 or when an integrated card of supporting both modes (i.e., the GSM and CDMA modes) is inserted into one of slots #1 and #2, the initial mode may be set to be one of the GSM and CDMA modes. In this case, the initial mode is finally determined according to the scheme employed in the main system of the provider. That is, the control unit performs an initial drive in a GSM mode when the main system of the provider employs the GSM scheme, and the control unit performs the initial drive in a CDMA mode when the main system of the provider employs the CDMA scheme.

When it is assumed that the main system of the provider employs the GSM scheme, the control unit performs its initial drive in the GSM mode and determines if a GSM signal is received for a predetermined period of time (e.g., 10 to 30 seconds) in a user's current location. When a GSM signal is not received for the predetermined period of time, the control unit automatically performs mode change into the CDMA mode and may notify the user of the mode change by displaying a proper message on the display unit 600.

In spite of such a mode change into the CDMA mode, when even a CDMA signal is not received for a predetermined period of time (e.g., 30 seconds), 'escape from communication range' is displayed on the display unit 600. Thereafter, the control unit, at a predetermined interval, determines if a CDMA signal is received.

When a CDMA signal is not received for a predetermined period of time (e.g., 10 minutes) or more, the control unit again enters the GSM mode and repeats a procedure of determines if a GSM signal is received.

When it is determined that the mobile communication terminal is located out of the communication ranges for both CDMA and GSM modes, the mobile communication terminal may repeat the above-described operations while increasing the time interval for mode change in consideration of power consumption of the mobile communication terminal.

When a card for supporting one mode is inserted into one of two slots, the control unit displays information of the inserted card on the display unit 600 to be seen by its user, and selects the mode supported by the inserted card as a drive mode of the terminal. In this case, if a signal of the mode supported by the inserted card is not received, it is natural to execute an algorithm of 'escape from a communication range', which is performed in a typical mobile communication terminal supporting a single mode, instead of executing the above-described mode change procedure.

Although the embodiments of the present invention utilize a display unit in order to notify a user of various information (e.g., information shown in FIGS. 2 to 7), it is also noted that the information can be audibly notified using voice. For example, it is possible to output a voice message (such as "Area for GSM service, Please insert another card."), advising a user to insert another card, through a speaker (not shown).

As described above, the apparatus and the method according to the present invention automatically determines the type of card inserted into one or more slots in a mobile communication terminal (such as a world phone) supporting both GSM and CDMA, and drive the terminal in a mode corresponding to the type of the card. Accordingly, it is unnecessary for a user to know the type of card held by the user or the type of inserted card. In addition, when two or more cards supporting different modes from each other are inserted into slots in the terminal, the terminal automatically drives in an initial mode according to the main system of a provider and then enters the next mode when a signal of a relevant mode is not received for a predetermined period of time, such that the present invention has the advantage in that it is not necessary for a user to be concerned about various mode changes, etc.

While the present invention has been shown and described with reference to certain preferred embodiments thereof, it will be understood by those skilled in the art that various changes in form and details may be made therein without departing from the spirit and scope of the present invention as defined by the appended claims. Accordingly, the scope of the invention is not to be limited by the above embodiments but by the following claims and the equivalents thereof.

What is claimed is:

1. A dual-mode mobile communication terminal operating in a first communication mode and a second communication mode, the dual-mode mobile communication terminal comprising:

a first slot receiving either one of a first card and a second card, the first and second cards being detachable from the dual-mode mobile communication terminal and having user subscriber information for the first communication mode and the second communication mode, respectively, the first card being of a first card type and the second card being of a second card type, the first card type being different from the second card type, such that each of the first slot and the second slot recognizes both the first card type and the second card type;

a second slot receiving either one of the first card and the second card;

a control unit automatically selecting a drive mode according to which of the first and second cards are inserted into at least one of the first slot and the second slot, and determining if the selected drive mode corresponds with a communication mode of a current system, wherein the control unit selects an initial mode of a provider as the drive mode when both the first and second slots include one of the first and second cards, selects a mode corresponding to one of the first and second cards inserted into the first slot as the drive mode when no card exists in the second, selects a mode corresponding to one of the first and second cards inserted into the second slot as the drive mode when no card exists in the first slot, and performs mode change into another mode when a signal of the initial mode is not received until a predetermined period of time elapses in the initial mode; and a message advising a user to insert another card is output on a text display unit when a signal of the drive mode is not received for a predetermined period of time.

2. The dual-mode mobile communication terminal as claimed in claim 1, further comprising a means for reporting at least one of a type of the inserted card and a selected drive mode to a user.

3. The dual-mode mobile communication terminal as claimed in claim 1, wherein when the first communication mode corresponds to a GSM (Global System for Mobile Communications) scheme and the second communication mode corresponds to a CDMA (Code Division Multiple Access) scheme, the first card is an SIM (Subscriber Identity Module) card and the second card is a UIM (User Identity Module) card.

4. A method for automatically recognizing a card and selecting a drive mode in a dual-mode mobile communication terminal, which has a first slot and a second slot, and operates in a first communication mode and a second communication mode, the method comprising the steps of:

determining by searching the first and second slots if at least one card exists in the first slot and the second slot, the at least one card being one of a first card and a second card, the first and second cards being detachable from the dual-mode mobile communication terminal and having user subscriber information for the first communication mode and the second communication mode, respectively, the first slot for receiving either one of the first card and the second card, the second slot for receiving either one of the first card and the second card, the first card being of a first card type and the second card being of a second card type, the first card type being different from the second card type, such that each of the first slot and the second slot recognizes both the first card type and the second card type;

when cards exist in both the first slot and the second slot, the cards being detachable from the dual-mode mobile communication terminal, reading the cards, notifying a user of relevant modes of the read cards, driving the dual-mode mobile communication terminal in an initial mode according to a main system of a provider, and entering another mode when a signal of the initial mode is not received during a predetermined period of time;

when a card exists in only the first slot, reading the card, notifying the user of a relevant mode of the read card, and driving the dual-mode mobile communication terminal in the relevant mode;

when a card exists in only the second slot, reading the card, notifying the user of a relevant mode of the read card, and driving the dual-mode mobile communication terminal in the relevant mode; and outputting a message on a text display unit advising a user to insert another card when a signal of the drive mode is not received until a predetermined period of time elapses.

5. The method as claimed in claim 4, wherein the step of determining if a card exists comprises the steps of:

determining if a first card exists by searching the first slot;

determining if a second card exists by searching the second slot when the first card exists in the first slot; and determining if the second card exists by searching the second slot when the first card does not exist in the first slot.

6. The method as claimed in claim 4, further comprising a step of notifying a user in advance that the terminal is going to drive in the initial mode.

7. The method as claimed in claim 4, further comprising a step of notifying a user of mode change into another mode before entering another mode.

8. The method as claimed in claim 4, wherein the first and second cards include at least one of an SIM (Subscriber Identity Module) card and a UIM (User Identity Module) card.

9. The method as claimed in claim 4, further comprising a step of notifying a user in advance that the terminal is going to drive in a relevant mode, when a card exists in any one of the first and second slots.

10. A method for automatically selecting a drive mode in a dual-mode mobile communication terminal having a first slot and a second slot and operating in a first communication mode and a second communication mode, the method comprising the steps of:

automatically selecting a drive mode according to a type of a card that exists in at least one of the first slot and the second slot, the card being one of a first card and a second card, the first and second cards being detachable from the dual-mode mobile communication terminal and having user subscriber information for the first communication mode and the second communication mode, respectively, the first slot for receiving either one of the first card and the second card, the second slot for receiving either one of the first card and the second card, the first card being of a first card type and the second card being of a second card type, the first card type being different from the second card type, such that each of the first slot and the second slot recognizes both the first card type and the second card type;

determining a communication mode being provided in a current system;

determining if the selected drive mode corresponds with the communication mode of the system, and notifying a user when the selected drive mode does not correspond with the communication mode of the system;

determining if a signal of the selected drive mode is received during a predetermined period of time; and outputting a message on a text display unit advising a user to insert another card when a signal of the drive mode is not received until a predetermined period of time elapses, wherein an initial mode according to a main system of a provider is selected as the drive mode when cards exist in both the first and second slots.

* * * * *